United States Patent Office 3,677,950

Patented July 18, 1972

3,677,950

CHEMICAL ETCHING SOLUTION FOR PRINTED WIRING BOARDS

Carmelo Leon Alderuccio, Tolland, Conn., assignor to Lee Alderuccio & Associates, Inc., Tolland, Conn.

No Drawing. Filed Apr. 30, 1969, Ser. No. 820,674

Int. Cl. C23g *1/14;* H05k *1/00*

U.S. Cl. 252—79.5 7 Claims

ABSTRACT OF THE DISCLOSURE

A chemical etching solution particularly adapted to selectively dissolve copper from laminated printed wiring boards in the presence of metals selected from the group consisting of tin, lead, nickel, gold and alloys thereof without causing attack of such metals consists of an aqueous ammoniacal solution of a normally acidic oxidizer, the solution having an alkaline pH up to about 11.

BACKGROUND AND SUMMARY OF THE INVENTION

The present invention relates to chemical etching solutions for selected metals and is directed especially to a new and improved etching solution particularly well suited for use in the production of printed wiring and the like.

A conventional technique for producing printed wiring consists in covering or masking certain areas of a copper layer with a resist and subsequently etching or dissolving the exposed copper to provide the desired wiring pattern. This etching operation may be conveniently accomplished by using aqueous solutions of an oxidizer for the copper Heretofore normally acidic oxidizers, that is, those oxidizers which dissolve in water to produce an aqueous solution in the acid pH range, such as cupric chloride or ammonium persulfate (peroxydisulfate), have been utilized effectively. Since it is well known that metal dissolved by such solutions readily precipitates as the pH rises toward the alkaline range, it has been common to add strong mineral acids to the etching solutions to maintain their acidic character. However, these acid solutions possess certain inherent drawbacks or restrictions, such as corrosiveness and waste disposal problems, attack of solderable resists and excessive undercutting of the resists during the etching operation, a rather slow dissolution rate and a limited capacity for retaining the dissolved metal. As a result the manufacturers of printed wiring must take special precautions and constantly monitor and adjust the solutions during the etching operation.

Commercially available alkaline etching solutions utilizing normally alkaline oxidizers, such as sodium chlorite, have met with some success particularly where solderable metal resists are employed since attack on the resist is substantially reduced. Although the chlorite system does not substantially attack such resists, it has been found that the alkali metals used therein do cause some disfiguring of the resists, sometimes resulting in a loss of solderability. More significant, however, is the solution instability of alkaline systems employed heretofore, particularly those systems having a carbonate ion present in the etching solution. Because of the instability characteristics of such systems, the various components of the system must be packaged separately and mixed only immediately prior to use. Once mixed, the activity of the solution promptly starts to dissipate. Additionally, as soon as some metal is dissolved, the system is so unstable that it prevents reuse after an idle period, such as an overnight shutdown. Coupled with this stability problem is the fact such systems also cause substantial undercutting and lack a uniform etch rate as the concentration of dissolved metal increases within the solution.

Accordingly, it is a primary object of the present invention to provide a new and improved chemical etching solution capable of overcoming many of the deficiencies of prior acidic and alkaline systems while retaining their beneficial characteristics. Included in this object is the provision for an etching solution which enables prolonged operation in the presence of solderable resists, yet is sufficiently solution-stable to permit reuse despite interruptions in the etching operation.

Another object of the present invention is to provide a new and improved etching solution of the type described which exhibits not only an improved stability but also a capacity for dissolving higher concentrations of metal and a more uniform etch rate over a prolonged period of precipitation-free operation.

A further object of the present invention is to provide a new and improved etching solution of the type described which exhibits selective dissolution of metals in a fast and efficient manner with substantially no attack to solderable resists or undercutting thereof.

Other objects will be in part obvious and in part pointed out more in detail hereinafter.

These and related objects are accomplished in accordance with the present invention by providing an aqueous etching solution having a pH in the alkaline range but utilizing a normally acidic oxidizer. Such solutions are suitable for use on printed wiring boards having solderable resists containing tin, lead, nickel, gold and alloys thereof without causing attack to the resists and generally comprise at least about 0.1 mole per liter of a normally acidic oxidizer having an oxidizing radical selected from the group consisting of cupric and persulfate ions for dissolving metals not protected by the resists and a water-soluble stabilizing compound for coordinate covalent bonding of the dissolved metal thereby holding the metal in the alkaline solution.

A better understanding of the objects, advantages, features, properties and relationships of the invention will be obtained from the following detailed description which sets forth certain illustrative embodiments and is indicative of the various ways in which the principle of the invention is employed.

As mentioned, the oxidizer utilized in accordance with the present invention is of an acid character so that if dissolved in water it will produce an aqueous solution having a pH within the acid range generally varying from about 4.0 to 6.5. These oxidizers are typically water-soluble materials and only mildly acidic, although they exhibit strong oxidizing capabilities. In accordance with the present invention they should also exhibit solubility in alkaline solutions thereby avoiding the necessity of initially forming an acid solution and subsequently adjusting the pH to effect the desired alkaline condition. Exemplary of such materials are the persulfates such as ammonium persulfate or the water-soluble cupric salts such as cupric chloride or cupric sulfate. Although ammonium persulfate is preferred by reason of its desirable solubility characteristics, other persulfates or mixtures of persulfates having the requisite solubility may be employed. However, because of the corrosive attack on the solderable resists evidenced by the alkali metal cations, sodium or potassium persulfate generally are avoided. It will, of course, be appreciated that combinations of oxidizers may be used where compatible so long as a clear precipitate-free solution results therefrom. For example, the cupric salts may be employed in place of or in conjunction with some of the persulfate oxidizers.

The etching solutions of the present invention generally contain about 5 to 50 percent by weight of the acid oxidizers, resulting in oxidizer concentrations as low as 0.1 mole per liter and as high as a saturated solution at room temperature, the preferred concentration range being 0.25 to 1.0 mole per liter. The exact amount of oxidant used can vary with the particular application but should not exceed the point of saturation since clear etching solutions are required if optimum etching results are to be obtained. It will, of course, be appreciated that solutions having a high concentration may be prepared for shipment and storage and then diluted to the desired operating concentration prior to use in the etching bath.

The stabilizing compounds utilized in the etchant solution of the present invention are water-soluble materials capable of associating with the dissolved metal by coordinate covalent bonding therewith at the operating pH of the solution. By their use, the etching solution is capable of suspending a greater quantity of the dissolved metal in the solution than might otherwise be possible, thus prolonging the useful life of the solution. In the manufacture of the printed wiring boards and the like the metals most frequently being dissolved are copper and alloys thereof, so that the preferred stabilizer must be capable of forming soluble chelated copper ions. Of course, it will be appreciated that other metals such as zinc, cadmium, silver and the like may also be advantageously etched by the solution of the present invention.

Although organic stabilizers may be employed, the preferred materials from an economic standpoint are inorganic, such as ammonia which is conveniently available in gaseous form or as an aqueous ammonium hydroxide solution. Other inorganic stabilizers capable of forming the requisite coordinate bonding with the metal ions as they are dissolved from the surface of the conductive plate may also be employed so long as they do not adversely effect the printed wiring or other workpiece.

The amount of stabilizer used in the etching solution may vary although it is generally preferred that it be in excess of the amount needed to form the desired coordinate bonding with the metal being dissolved. Accordingly, the molar ratio of the stabilizer relative to the oxidizer should be in excess of 2:1. As will be appreciated the preferred ratio is substantially higher, being limited only by the solubility of the stabilizer in the aqueous solution and the desired operating conditions of temperature and pH.

Auxiliary stabilizers may additionally be employed, particularly where the auxiliary stabilizer has a common ion with the primary stabilizer. Typical of such materials is ammonium chloride which may be used in conjunction with the ammonium hydroxide solution to enhance and promote the continued coordiante covalent bonding of the copper as it is dissolved from the printed wiring boards and the like.

In preparing the etching solutions of the present invention, it is preferred that the solution be constantly maintained within the alkaline range even while dissolving the acid oxidizer therein, thus avoiding a cross-over from an acid pH condition to an alkaline pH condition. This is particularly important when using cupric salts such as cupric chloride or cupric sulfate as the primary oxidizer of the etching solution since a precipitate will otherwise form causing unsatisfactory delay in preparing the solution. Thus, best results are achieved by starting with an ammonium hydroxide solution, dissolving the cupric chloride oxidizer and ammonium chloride stabilizer therein while avoiding a drop in the pH below 7.0 and subsequently adjusting the pH to a desired level by the addition of increased amounts of ammonium hydroxide and/or water. The manner of preparing the solution not only provides for a stabilized, precipitant-free solution but also permits the preparation of a more highly concentrated oxidizer solution which may be stored for prolonged periods of time or shipped in its concentrated form for subsequent dilution immediately prior to use.

As mentioned hereinbefore, it has been found that the alkali metal cations such as sodium cause disfiguration of the solderable resists on printed wiring boards, frequently resulting in an unsolderable resist. Accordingly, the use of materials containing such cations has been avoided. Instead ammoniacal compounds and solutions have been used not only for the purpose of incorporating the desired stabilizers into the etching solution but also for adjusting the pH of that solution to the desired operating level. In this connection, it has been found that alkaline solutions having a pH up to about 11 work satisfactorily while the preferred pH for the etching solution is about 8.5 to 10.5. At the lower alkaline levels close to pH–7 there is the danger of loss of solution capacity for the dissolved metal while the very high pH values generally require the presence of a very strong alkali such as sodium hydroxide.

A typical etching solution formulated in accordance with the present invention may have the following composition:

| Components: | Percent by weight |
|---|---|
| Acidic oxidizer (cupric chloride) | 10 |
| Primary stabilizer (ammonia in a concentrated 15 N ammonium hydroxide solution) | 5 |
| Auxiliary stabilizer (ammonium chloride) | 10 |

Such an etching solution exhibits a pH of 9.0 and an excellent solution stability. In other words, the solution possesses not only the capacity for retaining large quantities of dissolved metal in solution but also the ability to maintain a substantially uniform or stable etch rate during practically its entire operating period. For example, the solution of the present invention far exceeds the 6 ounce per gallon copper capacity conventionally possessed by earlier solutions and consistently exhibits a capacity of more than twice that amount, easily approaching and exceeding about 16 ounces of copper per gallon of solution. Additionally, the solution exhibits shelf stability prior to use and permits extended periods of non-use without loss of activity even after dissolving only a portion of its normal metal capacity. In the case of cupric chloride it is particularly surprising that these solutions exhibit no attack on solderable resists since acidic cupric chloride solutions have consistently caused such attack thereby prohibiting their use with such resists.

Although the solutions of the present invention will operate effectively at room temperature, it is preferred that slightly elevated operating temperatures be employed for best results. Of course, certain practical limits are encountered in order to prevent excessive loss of ammonia. Accordingly, an operating temperature of 35° C. to 60° C. is usually employed with the preferred temperature range being between 40° C. and 50° C. Although an increase in operating temperature will generally accelerate the etch rate, this advantage is generally counterbalanced by the increased difficulty in maintaining the etching solutions at the desired concentration levels. For this reason the preferred temperature range is generally used.

In order that the present invention may be more readily understood the following examples are given by way of illustration but are not intended to be a limit on the practice of the invention.

Example I

About 50 parts by weight of ammonium persulfate and 50 parts by weight of ammonium chloride were completely dissolved in about 1 liter of 3 N ammonium hydroxide solution resulting in an etching solution having a pH of 9.0 and a persulfate concentration of about 0.44 mole per liter. The solution was heated to a temperature of about 50° C. and a copper foil having a thickness of 1.34 mils was sprayed with the solution. The copper was completely dissolved in 90 seconds at that temperature.

Example II

An etching solution identical to the solution of Example I was prepared and heated to about 50° C. A laminated printed wiring board having a copper foil 0.00134 inch thick and metal resists thereon was sprayed with the etching solution in the same manner as Example I.

The metal resists were formed from tin, tin alloy, lead, lead alloy and nickel-gold and were secured to different selected areas of the laminated board. Upon treatment with the etching solution the unprotected copper foil was dissolved in 90 seconds at substantially the same etch rate as in Example I. The metal resists exhibited no attack whatsoever and substantially no undercutting of the resists was evident.

Example III

An etching solution identical to the solution of Example I was prepared and used on different metals at different solution temperatures. The results are listed in the following table:

| Material | Solution temperature (° C.) | Etch rate (time)[1] seconds |
|---|---|---|
| Zinc | 32 | 70 |
| Cadmium | 46 | 130 |
| Silver | 46 | [2] 10 |

[1] Time required to dissolve an 0.0001 inch layer of metal.
[2] Minutes.

Example IV

About 100 parts by weight of cupric chloride and 100 parts by weight of ammonium chloride were dissolved in 6 N ammonium hydroxide solution resulting in an etching solution having a pH of about 10.5–11.0 and a cupric chloride concentration of about 0.75 mole per liter. The etching solution was heated to a temperature of about 43° C. An 8 ounce copper plate was treated with a gallon of the solution causing dissolution of the copper at a substantially constant etch rate of 0.5 ounce per minute. The solution completely dissolved the copper without any clouding of the solution or other evidence of the dissolved metal precipitating out of solution. Thus, it can be seen the etching solution of the present invention possesses a solution capacity in excess of 8 ounces per gallon.

Example V

The solution used in Example IV and containing 8 ounces of dissolved copper was permitted to remain inactive for 72 hours. After this period of inactivity it was reheated to a temperature of 50° C. and readily dissolved an additional ounce of copper at the same etch rate, that is, 0.5 ounce per minute, thereby clearly establishing the stability and reusability of the solution.

Example VI

An etching solution was prepared having the same composition as the solution of Example IV. Additionally, a pair of laminated printed wiring boards identical to the board of Example II were provided. The solution was heated to an operating temperature of 43° C. and was used on both boards. In each instance the etching solution exhibited a substantially constant etch rate of 0.5 ounce per minute. The solution did not attack the solderable metal resists or cause excessive undercutting thereof.

Example VII

A gallon of etching solution identical in composition to the solution of Example IV was used to dissolve 16 ounces of copper without any evidence of the formation of a precipitate.

Example VIII

An etching solution identical to the solution of Example IV was prepared and used on different metals at different temperatures. The results are listed in the following table:

| Material | Solution temperature (° C.) | Etch rate (time)[1] seconds |
|---|---|---|
| Zinc | 38 | 35 |
| Cadmium | 50 | 90 |
| Aluminum | 40 | [2] 4 |
| Silver | 50 | [2] 14 |

[1] Time required to dissolve an 0.0001 inch layer of metal.
[2] Minutes.

As will be apparent to persons skilled in the art, various modifications, adaptations and variations of the foregoing specific disclosure can be made without departing from the teachings of the present invention.

I claim:

1. A chemical etching solution for the rapid dissolution of copper from printed circuit boards and the like and particularly adapted to selectively dissolve copper in the presence of metals selected from the group consisting of tin, lead, nickel, gold and alloys thereof without causing attack thereof comprising an aqueous solution having dissolved therein at least 0.1 mole per liter to saturation of a water-soluble cupric salt selected from the group consisting of cupric chloride and cupric sulfate and a water-soluble stabilizer for maintaining said solution at a pH of about 8.5 to 11 and adapted to form soluble complex ions with copper as it is dissolved, the molar concentration of the stabilizer being at least twice that of the cupric salt, said solution, exhibiting a substantially uniform etch rate over prolonged periods of use and having a shelf life and stability permitting effective reuse without substantial reduction of the etch rate.

2. The solution of claim 1 wherein the stablizer is ammonium hydroxide.

3. The solution of claim 1 including an auxiliary stabilizer having a common ion with the inorganic stabilizer, the solution being substantially free of alkali metal cations.

4. The solution of claim 1 wherein the cupric salt concentration is about 0.25 to 1.0 mole per liter and the pH of the solution is about 8.5–10.5.

5. A method for chemically etching a copper-containing surface having uncovered areas and resist covered areas comprising the steps of providing an ammoniacal solution of a water-soluble cupric salt selected from the group consisting of cupric chloride and cupric sulfate, the molar concentration of the ammonium ion being at least twice that of the cupric ion, said solution having an alkaline pH of about 8.5 to 11, heating the solution to a temperature of at least about 35° C. and treating the copper-containing surface with the heated solution to dissolve copper from the uncovered areas at a substantially uniform etch rate without substantially undercutting the resist covered areas.

6. The method of claim 5 wherein the heated solution has a temperature of 35° C.–60° C.

7. The method of claim 5 wherein the ammoniacal solution is an ammonium hydroxide solution having a normality between about 3 N and 6 N.

References Cited

UNITED STATES PATENTS 3,466,208 9/1969 Slominski ............ 156—18
3,476,624 11/1969 Hogya et al. .......... 156—13

JACOB H. STEINBERG, Primary Examiner

U.S. Cl. X.R.

156—3, 18